United States Patent [19]

Bulla

[11] Patent Number: 5,354,026

[45] Date of Patent: Oct. 11, 1994

[54] PORTABLE SELF-LEVELING CLAMP-ON UTILITY HOOK

[76] Inventor: Wesley A. Bulla, 2113-B Elliott Ave., Nashville, Tenn. 37204

[21] Appl. No.: 53,477

[22] Filed: Apr. 29, 1993

[51] Int. Cl.⁵ .............................................. A47B 96/06
[52] U.S. Cl. ................................ 248/229; 24/499; 248/231.5; 248/280.1; 248/288.3
[58] Field of Search ............ 248/231.5, 227, 229, 248/280.1, 278, 288.3, 123.1; 24/498, 499, 522, 339

[56] References Cited

U.S. PATENT DOCUMENTS

| | | | |
|---|---|---|---|
| 1,774,775 | 9/1930 | Weitz, Jr. | 24/339 X |
| 2,597,670 | 5/1952 | Pinto | 248/229 X |
| 4,735,388 | 4/1988 | Marks | 248/278 X |
| 4,997,156 | 3/1991 | Allen | 248/231.5 X |

FOREIGN PATENT DOCUMENTS 0139015 12/1979 Fed. Rep. of Germany ... 248/231.5

Primary Examiner—Ramon O. Ramirez

[57] ABSTRACT

A hook assembly is attached to a ball-and-socket assembly and further attached to a spring-loaded clamp assembly and counter-weighted and balanced so as to always suspend in a level and receiving position regardless of the direction or angle in which the supporting clamp assembly is positioned. The supporting clamp assembly has a semicircular indent on each clamp-face and a flat protrusion that extends to form two flat mating surfaces and two circular non-mating surfaces which allow the supporting clamp assembly to firmly grasp round as well as flat supporting objects. The device is portable and easily movable with one hand.

3 Claims, 25 Drawing Sheets 5,354,026

PORTABLE SELF-LEVELING CLAMP-ON UTILITY HOOK

BACKGROUND OF THE INVENTION

1. Field of the Invention

The present invention relates to hook type hangers, and more specifically, but not limited to, hooks, hangers, and accessories used in audio recording and video production studios, television and radio broadcast facilities, music libraries, audiophile listening rooms, home recording studios, and generally anywhere common monophonic or stereophonic audio headphones and related connecting cables are used.

2. Prior Art

In most, if not all, audio and video production and broadcast facilities, music libraries, and home recording studios, common audio headphones are used to monitor audio program material for the purposes of critical aural inspection. Also, in live recording studios where the separation of sound sources is critical, in order to facilitate the monitoring of audio program material, monophonic and/or stereophonic headphones are a necessity. During the act of recording or taping, while critical listening or aural monitoring is taking place, audio headphones are usually worn by the recording artists and technicians; however, in the interim or interims between recording takes and during breaks, while said headphones are temporarily not being used or worn by the artists and technicians, they are subject to unnecessary wear and tear and the headphone's useable life is reduced prematurely due to excess stress and physical abuse caused by the lack of a suitable place to temporarily rest the headphones until again needed. In current practice, when said headphones are temporarily not in use, they are usually placed on a chair, table, music stand, or more commonly, the floor. However, audio headphones are designed and manufactured to hang from a support strap and when laid on a flat surface such as a table, chair, or the floor, are subject to stress and flexing which causes unnecessary wear on the hinges and connections of the suspension strap and the speaker cups. Furthermore, and in many cases, while lying on the floor, said headphones are negligently trampled or stepped on and broken.

There are many hook types and clamp types such as the "Double Hooked Utility Hanger with Hanger Suspension Hole" Wolf U.S. Pat. Nos. 4,957,259, the "Hanger for Hanging Fabric" Berkowitz 4,193,504, the "Double Locking Snap Hook" Casebolt 4,997,647, the "Suction Cup having an Offset-Mounted Hook" Adams 5,078,356, the "Portable Apparatus for Holding Objects" Hoffman 4,903,929, the "Interconnected C-Clamps and Tensioning Means Therefor" Yang 4,747,590, the "Intravenous Pole Holder" LeBlanc and LeBlanc 4,190,224, the "Hose Holder" Eross 3,747,166, and various permanent and semipermanent coat, garment, and utility hangers which may be adaptable for the long-term storage of audio headphones. However, no device is known which is: (1) of the correct size and shape so as to properly suspend, without damage, a common set of audio headphones and associated electronic cables; (2) is portable, convenient and easy to use, and requiring no specific tools will temporarily attach to and remove from a microphone and/or music stand, or other common fixture in an audio recording studio, radio broadcast station, television/video production facility, home recording studio, or anywhere audio headphones are used; and (3) will allow for a large variety of support and suspension configurations by allowing said headphones to hang or suspend properly while the hook device itself is or may be employed at many directions or angles which might be necessary in order to facilitate easy and convenient use. In addition, no device is known which is easily adaptable and will accomplish the above stated objectives.

OBJECTS OF THE INVENTION

The principal object of the present invention is to provide a device for holding and properly suspending, so as not to cause damage, stress, and unnecessary wear, a common set of audio headphones and associated electronic cables.

It is also an object of this invention to provide a portable and easy to use clamp-on hook-type device which will allow for a large variety of support and suspension configurations by easily and temporarily attaching to both round and flat support objects of suitable shape and size.

A further object of this invention is to provide a hook-type device which will always remain in the proper receiving position regardless of the direction, angle, or pitch in which the supporting clamp is positioned or employed.

SUMMARY OF THE INVENTION

The foregoing objects can be accomplished by a molded or carved device prepared from durable plastics, metals, wood, or other suitable materials. The preferred embodiment of the invention will employ a spring-loaded clamp assembly which will have a semi-circular indent on each inner side of the clamping surface with a protrusion that extends to form two flat mating surfaces. The clamp shall be portable and easily removable by grasping with a single hand but shall retain enough clamping strength to securely hold up to two kilograms (6.6 pounds) of weight from any angle which might be employed. A hook of the proper shape and size, suitable for holding a common set of audio headphones is counter-weighted and balanced and attached to the clamp assembly by way of a ball-and-socket assembly. The counter-weight and balance of the hook, in response to the natural forces of gravity, will act upon the free movement of the ball-and-socket assembly and will cause the hook to remain upright and in the proper receiving position regardless of the direction in which the clamp is positioned.

DETAILED DESCRIPTION OF THE DRAWINGS

Figure 1:
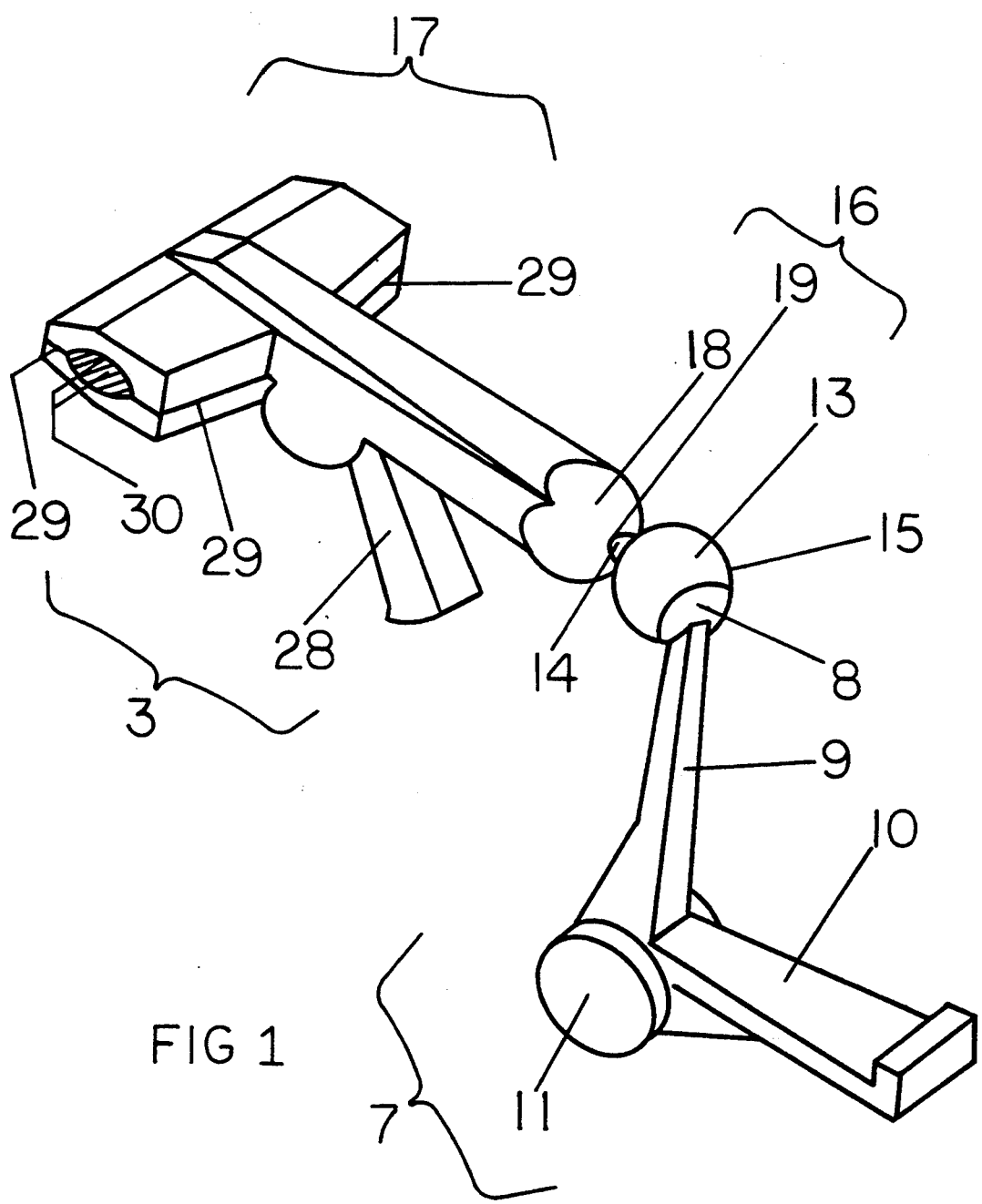
FIG. 1 is a hook-side isometric projection of the portable self-leveling clamp-on utility hook device in horizontal use position in accordance with the present invention.
Figure 2:
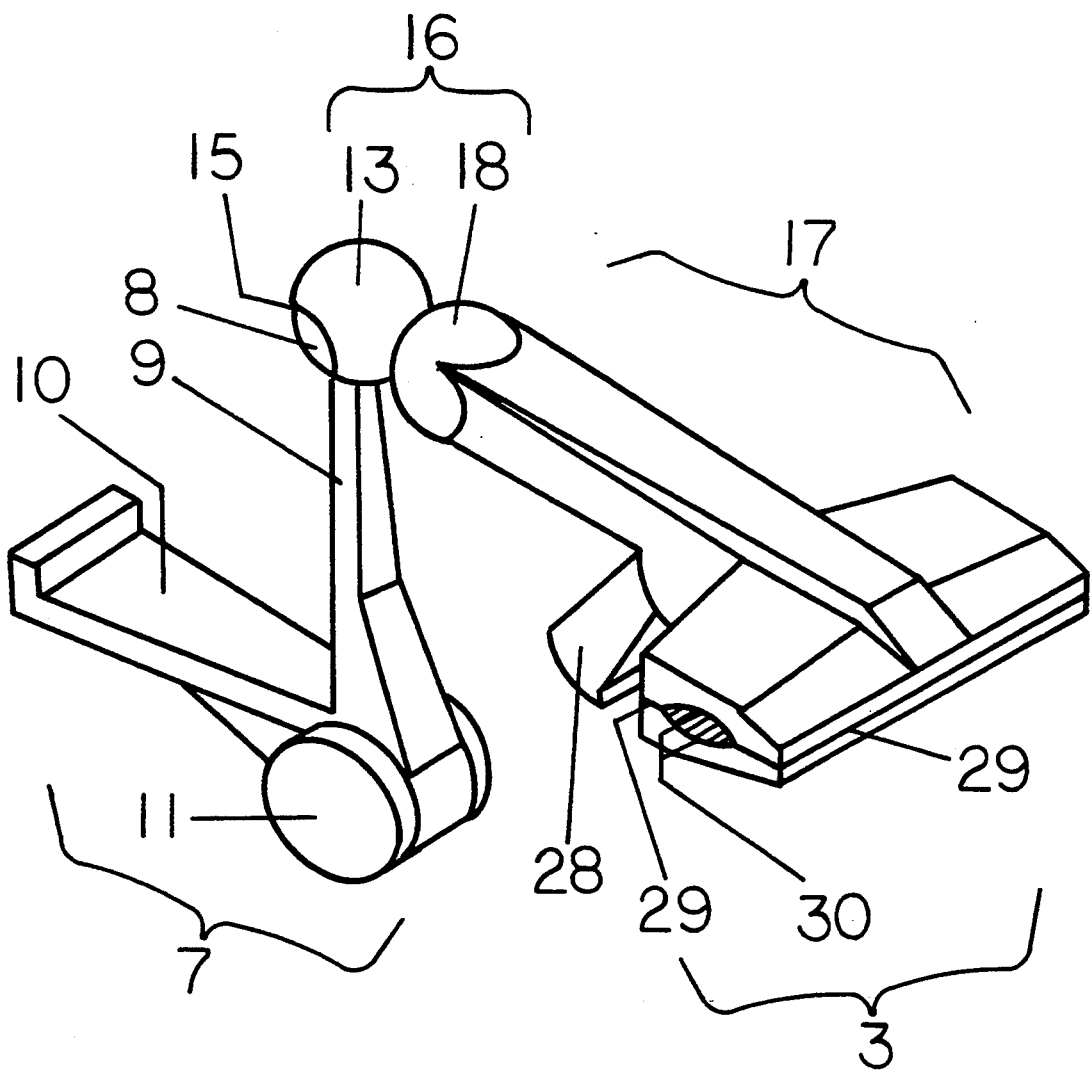
FIG. 2 is a clamp-side isometric projection of said device in horizontal use position.
Figure 3:
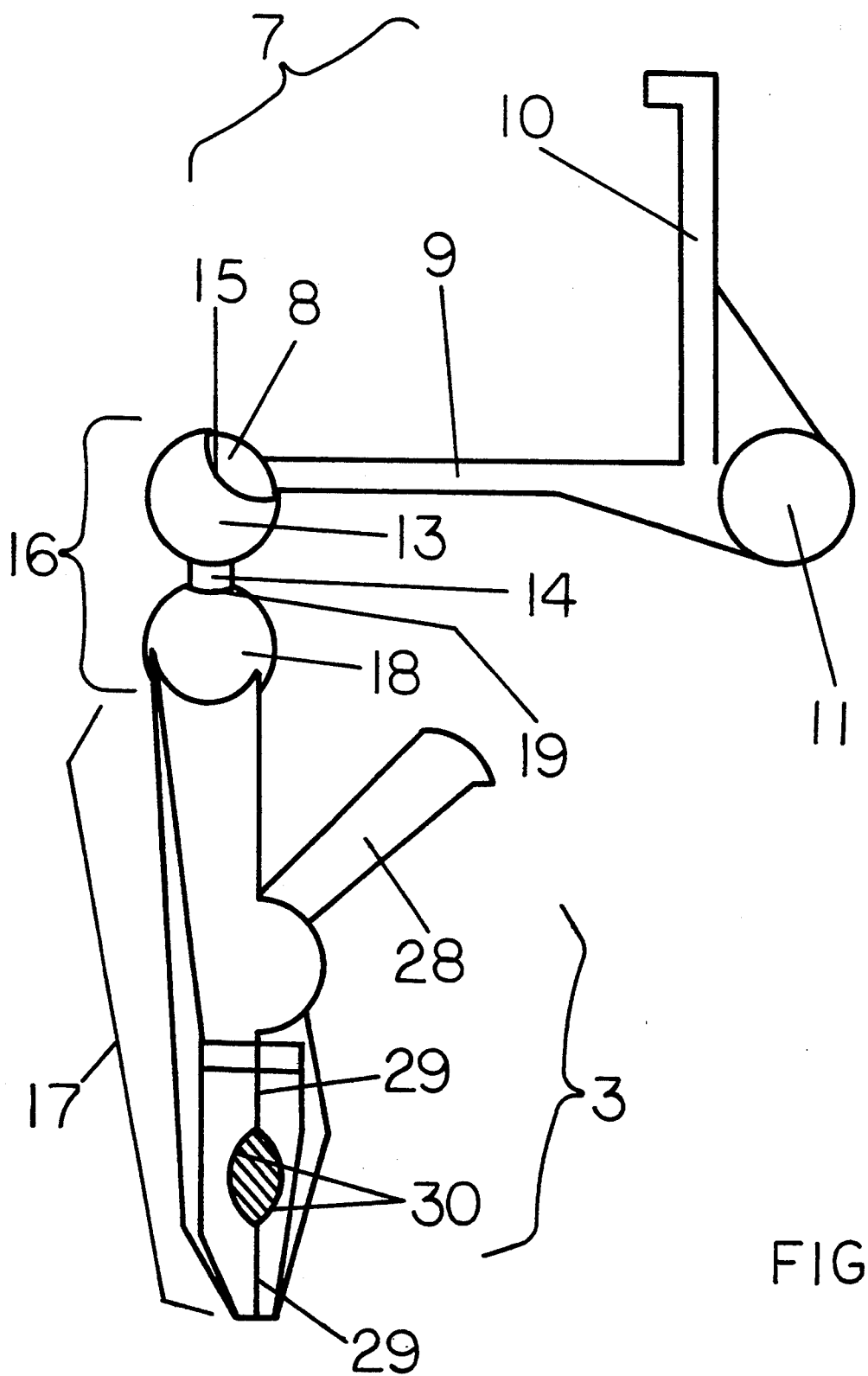
FIG. 3 is a side perspective of the device in horizontal use position.
Figure 4:
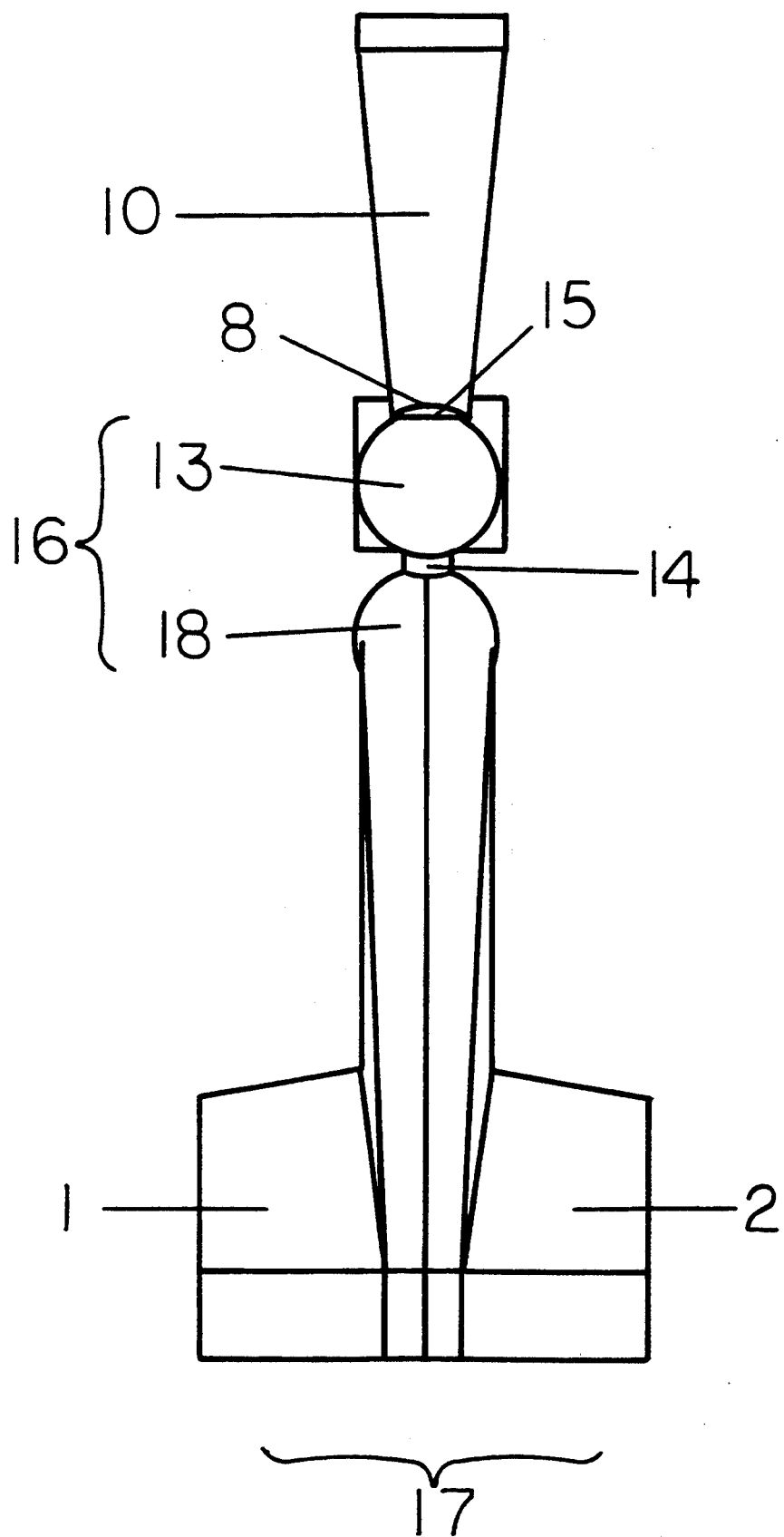
FIG. 4 is a top perspective of said device.
Figure 5:
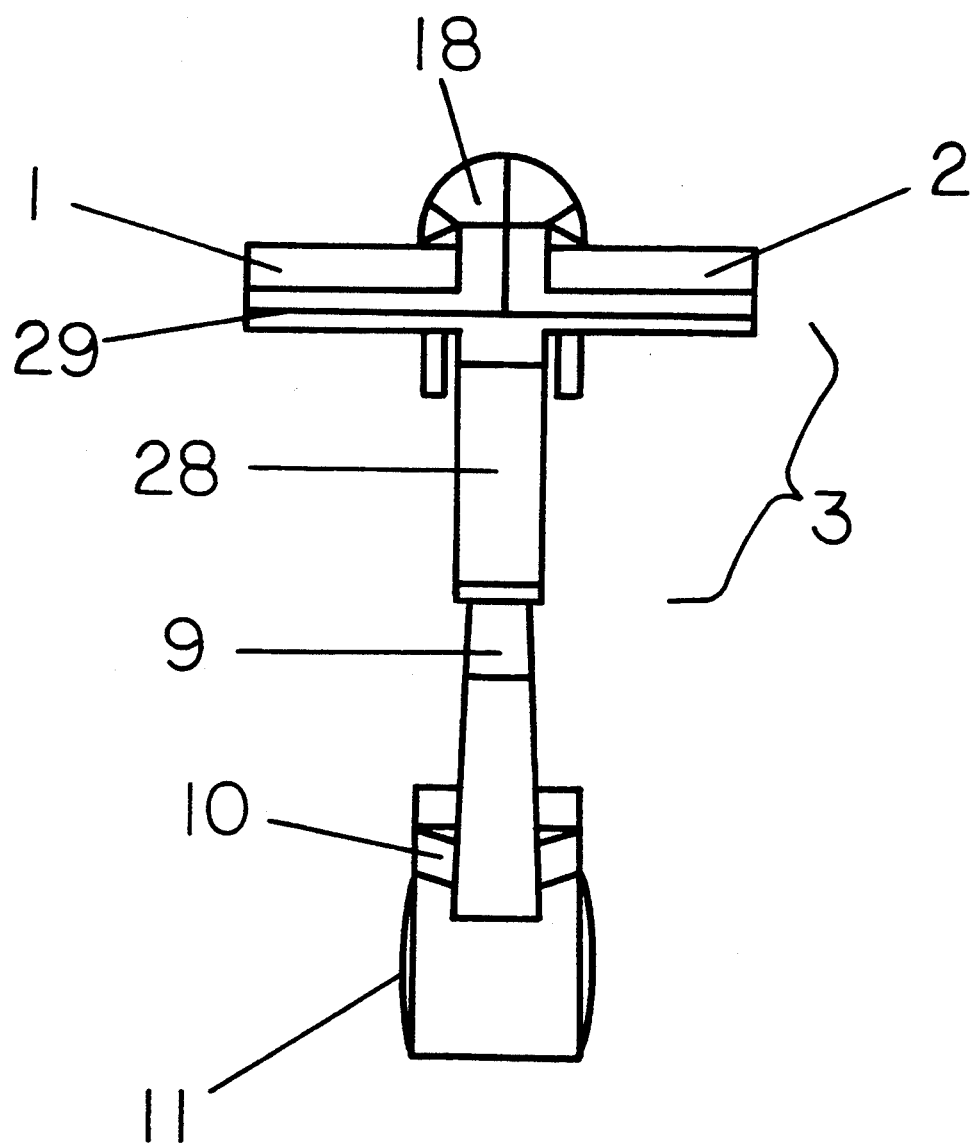
FIG. 5 is a clamp-side perspective of said device in horizontal use position.
Figure 6:
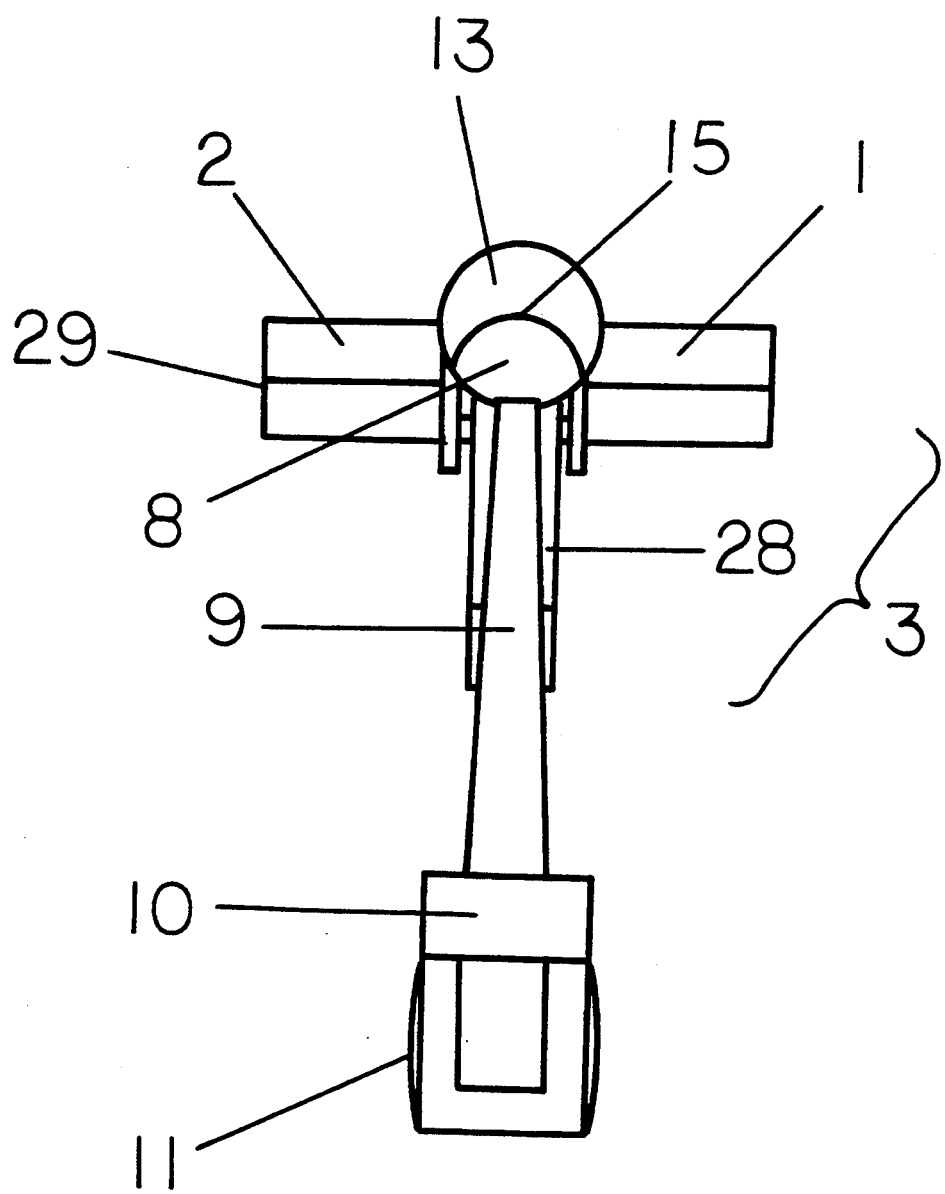
FIG. 6 is a hook-side perspective of said device in horizontal use position.

Referring to the drawings, the preferred embodiment of the self-leveling clamp-on hook device in accordance with the present invention comprises six, but not limited to six, individually molded parts, manufactured from strong and durable plastics, metals, wood, or a combination thereof, or other suitable materials, a tension spring, and a counter-weight of suitable material with sufficient mass and weight.

Figure 17:
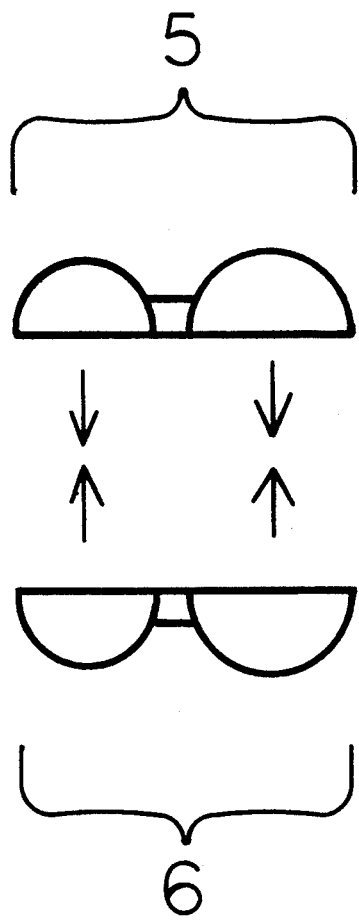
FIG. 17 is a top perspective of the left- and right-half adjoining spheres used in the ball-and-socket assembly-man. (Arrows indicate proper connection of parts)
Figure 18:
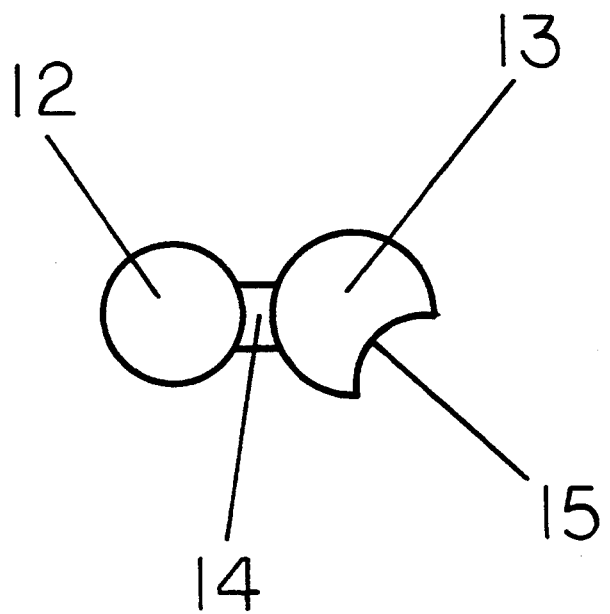
FIG. 18 is a side perspective of the right-half adjoining spheres used in the ball-and-socket assembly.
Figure 19:
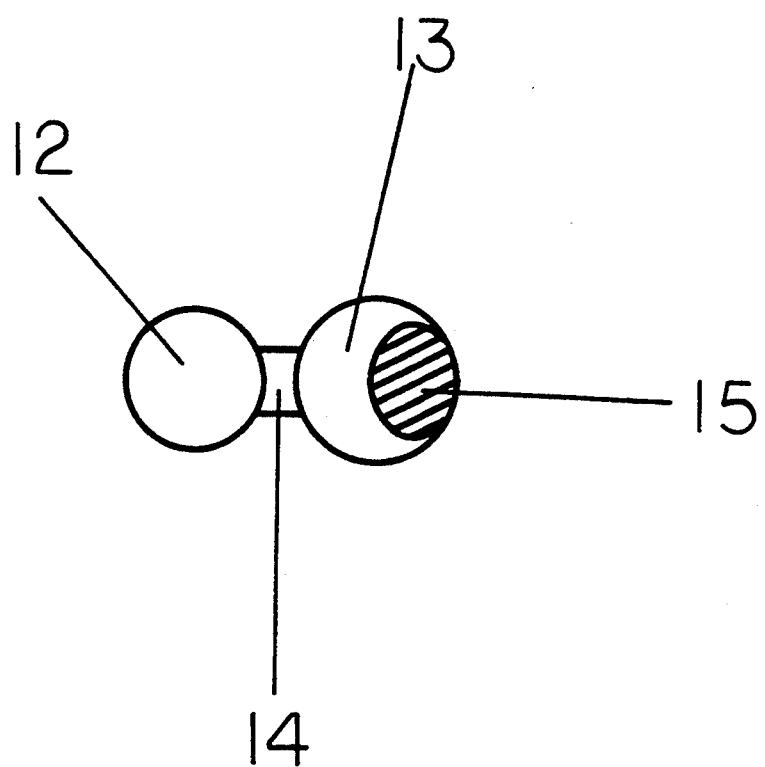
FIG. 19 is a bottom perspective of the adjoined spheres after proper mating of the left- and right-half adjoining spheres.
Figure 20:
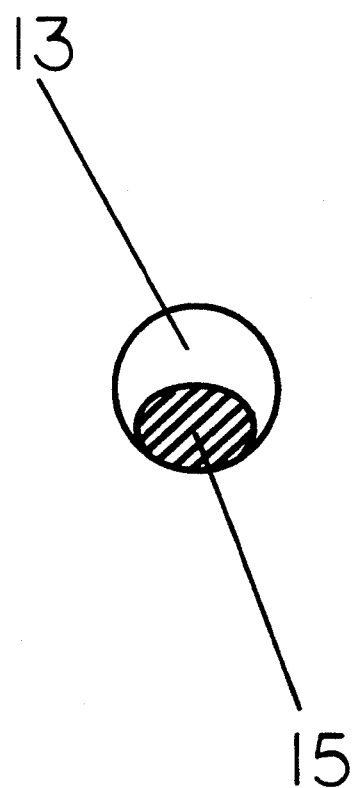
FIG. 20 is a hook-side perspective of the adjoined spheres after proper mating of the left- and right-half adjoining spheres.
Figure 21:
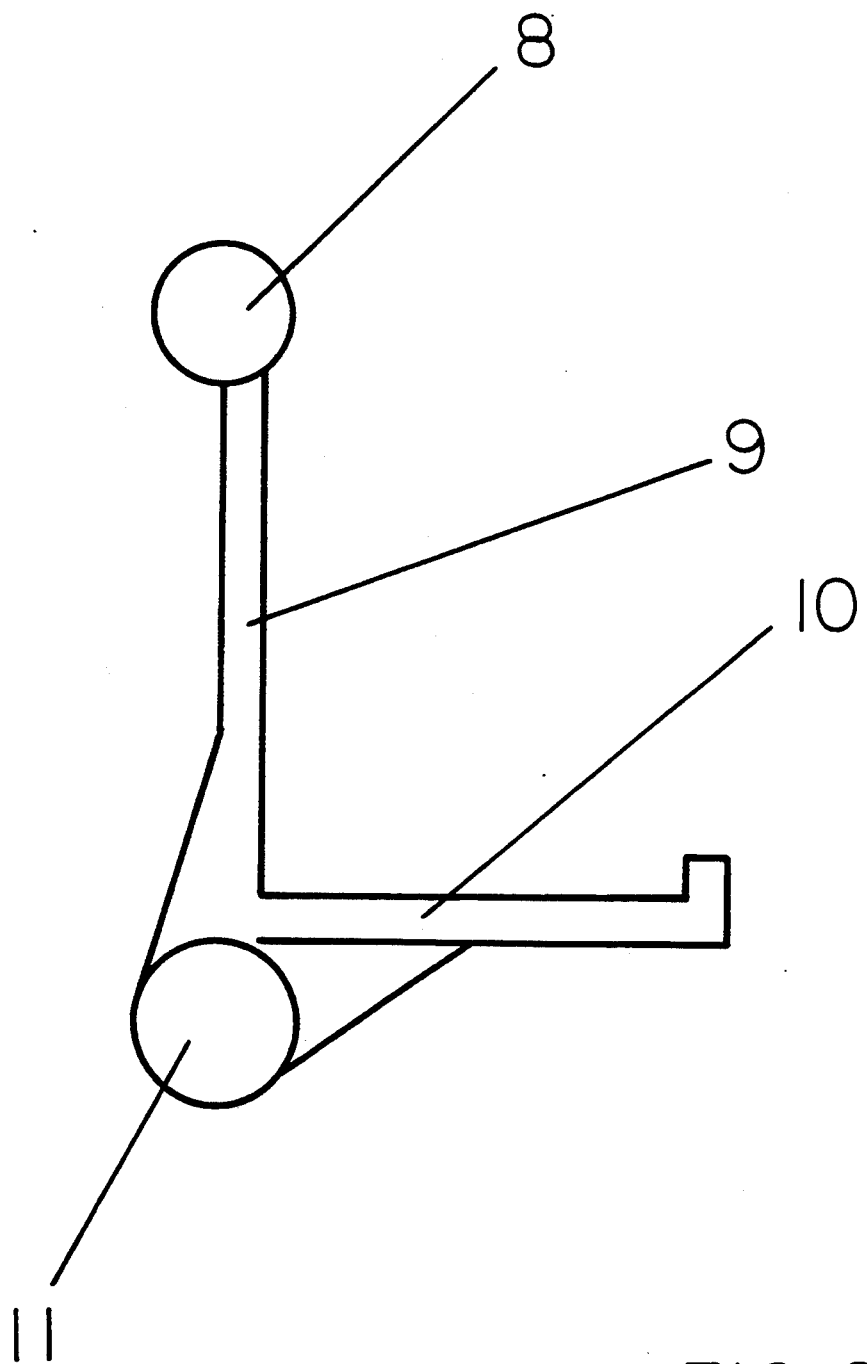
FIG. 21 is a side perspective of the hook assembly.
Figure 22:
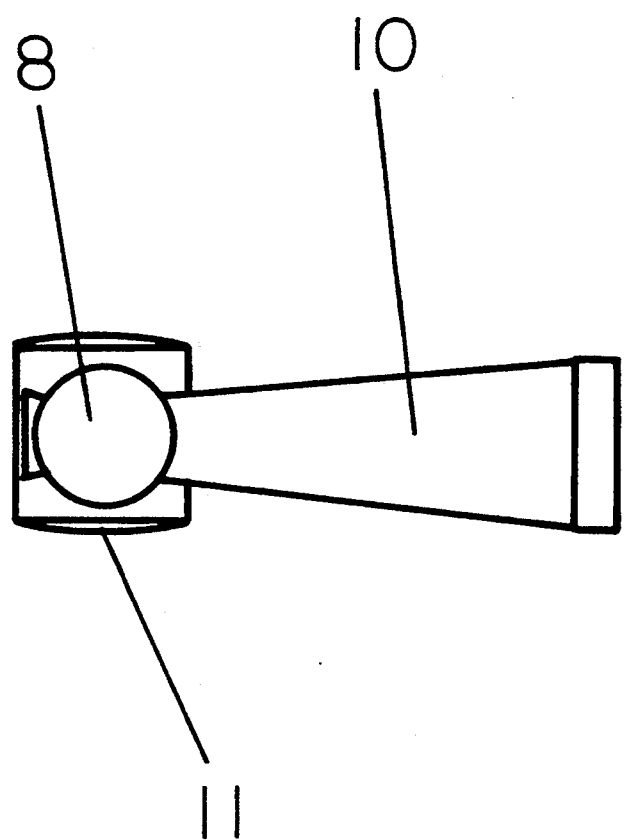
FIG. 22 is a top perspective of the hook assembly.
Figure 23:
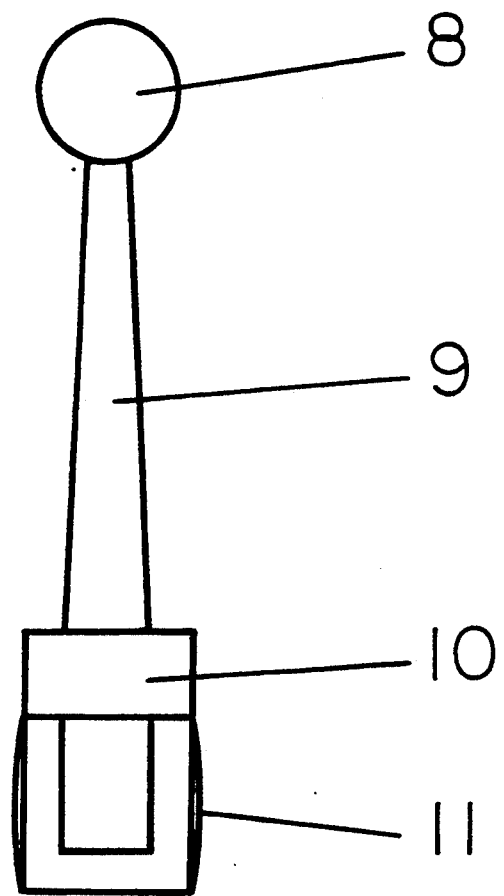
FIG. 23 is a hook-side perspective of the hook assembly.
Figure 24:
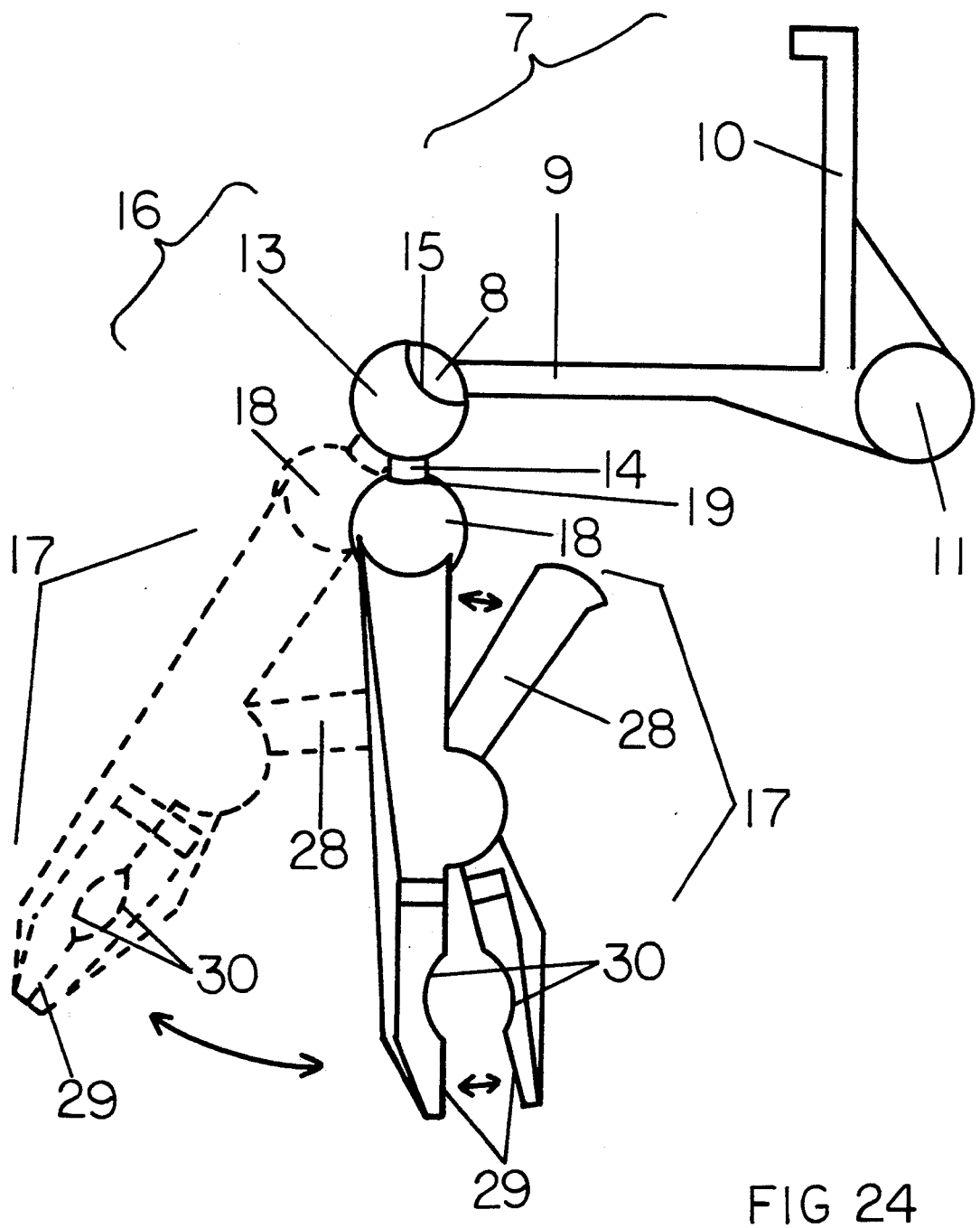
FIG. 24 is a side perspective of the portable self-leveling clamp-on utility hook device showing movement of the clamp assembly from horizontal to vertical use positions and the opening and closing movement of the gripping assembly.
Figure 25:
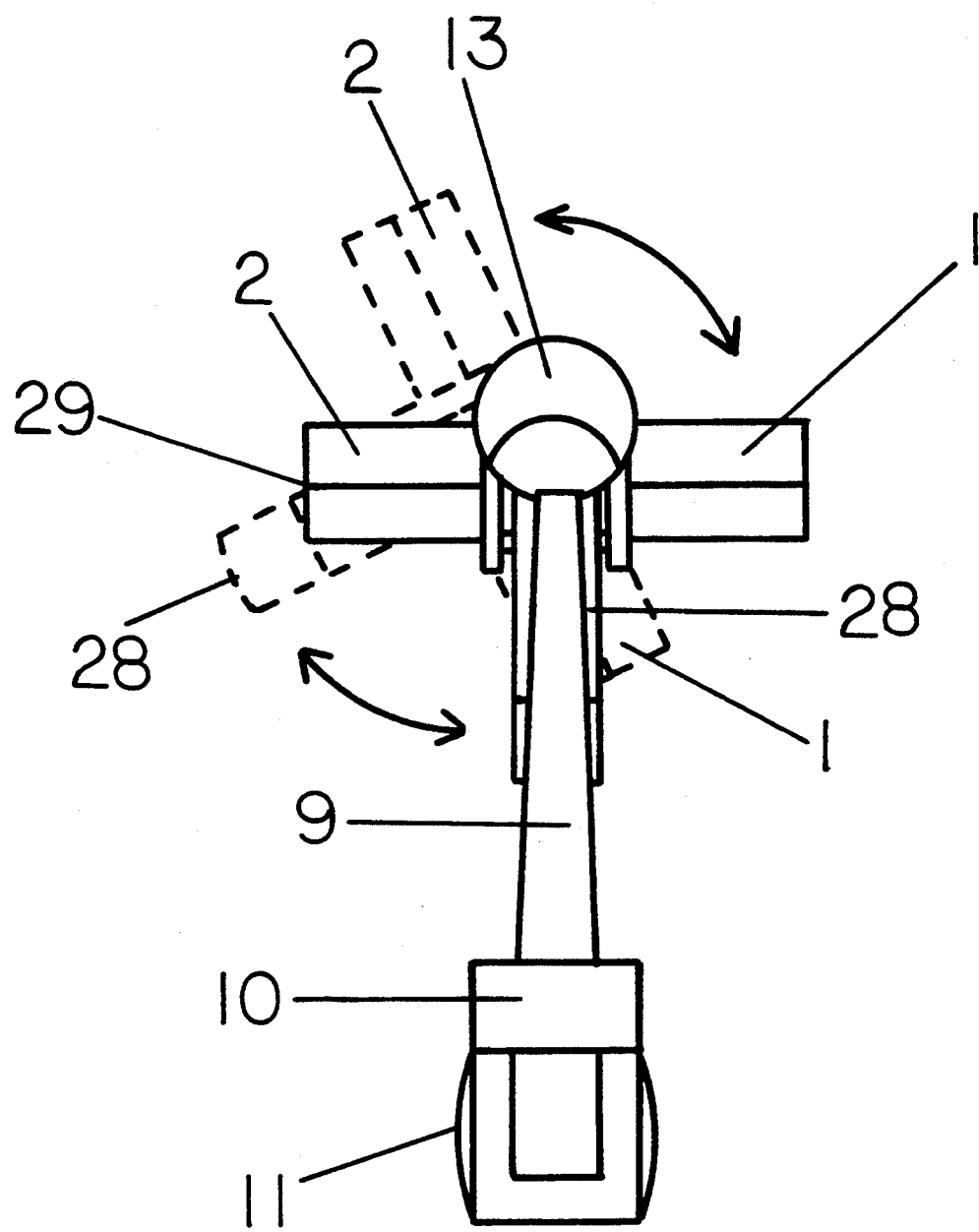
FIG. 25 is a hook-side perspective of said device showing circular 360 degree movement of the clamp assembly in relation to the hook assembly.

The self-leveling clamp-on hook device comprises an upper-clamp assembly 17 (FIGS. 1-4, 11-13) comprising left-frame assembly 1 and right-frame assembly 2 (FIGS. 4-13); a lower-clamp hand-grip assembly 3 (FIGS. 1-3, 5-8, 14-16); a tension spring 4 (FIGS. 7, 8); a ball-and-socket assembly 16 (FIGS. 1-4) comprising hollow sphere 18 (FIGS. 1-5, 9-13) which is formed from the proper molding and assembly of upper-clamp assembly 17, hollow sphere 13 (FIGS. 1-4, 6, 18-20) which is formed from the proper molding and mating of left-half adjoining spheres 5 with right-half adjoining spheres 6 (FIGS. 7, 8, 17), and solid sphere 8 (FIGS. 1-4, FIGS. 6-8, 21-23) which is contained within sphere 13; and hook assembly 7 (FIGS. 1-3, 7, 8, 21-23) comprising the afore mentioned solid sphere 8 attached to hanging shaft 9 further attached to holding plate 10 which is impregnated, preferably during the manufacturing and molding process, with counter-weight 11.

Hook assembly 7 may be molded as one solid piece or may be separate pieces permanently joined with a glue, epoxy compound, or by another suitable means. Holding plate 10 of hook assembly 7 is formed in a shape and size suitable for holding a common set of audio headphones and associated electronic cables. Counter-weight 11 of hook assembly 7 should be approximately two kilograms (6.6 pounds) in weight and is placed in a position on hanging shaft 9 that is lower than and opposite of holding plate 10 and therefore will position the center-of-gravity of hook assembly 7 to directly behind and below hanging shaft 9 which will offset the additional weight of a common set audio headphones and will further cause hook assembly 7, via the forces of gravity, to remain in level and receiving position when not in use.

Left-frame assembly 1 and right-frame assembly 2, and left-half adjoining sphere 5 and right-half adjoining sphere 6, when joined, may be permanently mated with a glue, epoxy compound, or by another suitable means. When properly moulded, mated and assembled, left-frame assembly 1 and right-frame assembly 2 will form upper-clamp assembly 17 and sphere 18 which is molded to be hollow and have circular opening 19. Left-half adjoining sphere 5 and right-half adjoining sphere 6, when properly moulded, mated and assembled, form two adjoined spheres which are joined by rotation shaft 14 (FIGS. 1, 3, 4): sphere 12 which is molded to be solid and recessed inside of sphere 18, and sphere 13 which is formed to be hollow and will enclose sphere 8.

During assembly, prior to the mating of left-half adjoining sphere 5 with right-half adjoining sphere 6, sphere 8 is placed inside of left-half adjoining sphere 5 and right-half adjoining sphere 6 with hanging shaft 9 protruding and allowed to hang and move freely through circular opening 15 (FIGS. 1-4, 6, 7, 18-20) of the sphere 13. The free movement of sphere 8 inside of sphere 13 which is further attached to hook assembly 7 will allow hook assembly 7 to rotate 360 degrees in the horizontal plane and more than 90 degrees in either the vertical or lateral planes. In a like manner, during assembly and prior to the mating of left-frame assembly 1 with right-frame assembly 2, solid sphere 12 comprising left-half adjoining sphere 5 and right-half adjoining sphere 6 is placed inside of left-frame assembly 1 and right-frame assembly 2 with rotation shaft 14 protruding through circular opening 19 of sphere 18. The free movement of sphere 12 inside of sphere 18 allows rotation shaft 14 and attached sphere 13 to rotate 360 degrees.

The movement of ball-and-socket assembly 16 by way of the forces of gravity exerted on counter-weight 11 and the interworking of the four spheres: hollow sphere 18, the two adjoined spheres 12 and 13, and sphere 8 will cause hook assembly 7 and holding plate 10 to always suspend in a level and receiving position regardless of the direction in which upper-clamp assembly 17 is positioned.

Figure 7:
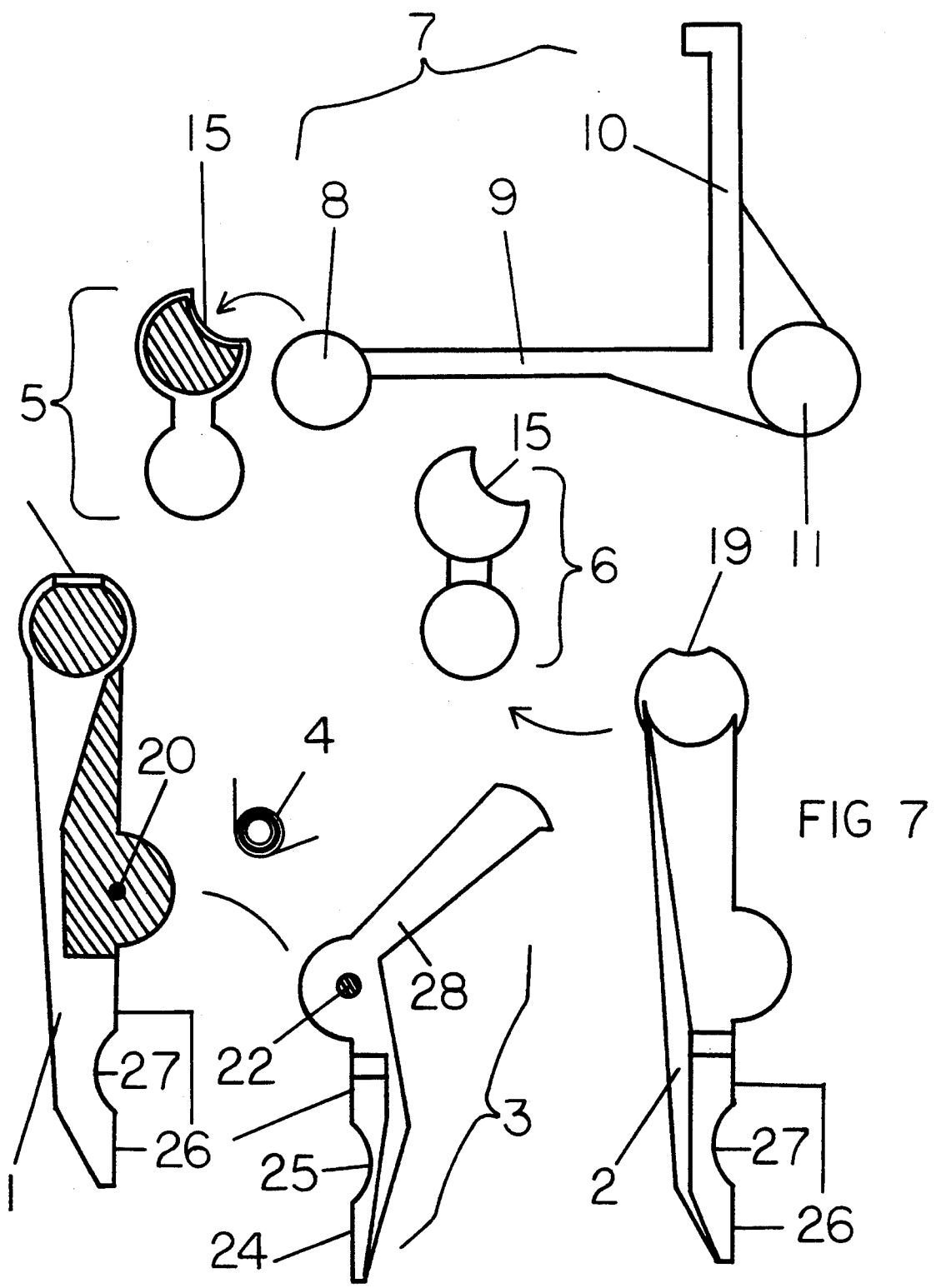
FIG. 7 is a break-apart side perspective of the individual parts necessary to assemble the device in accordance with the present invention. (Arrows indicate proper connection of parts).
Figure 8:
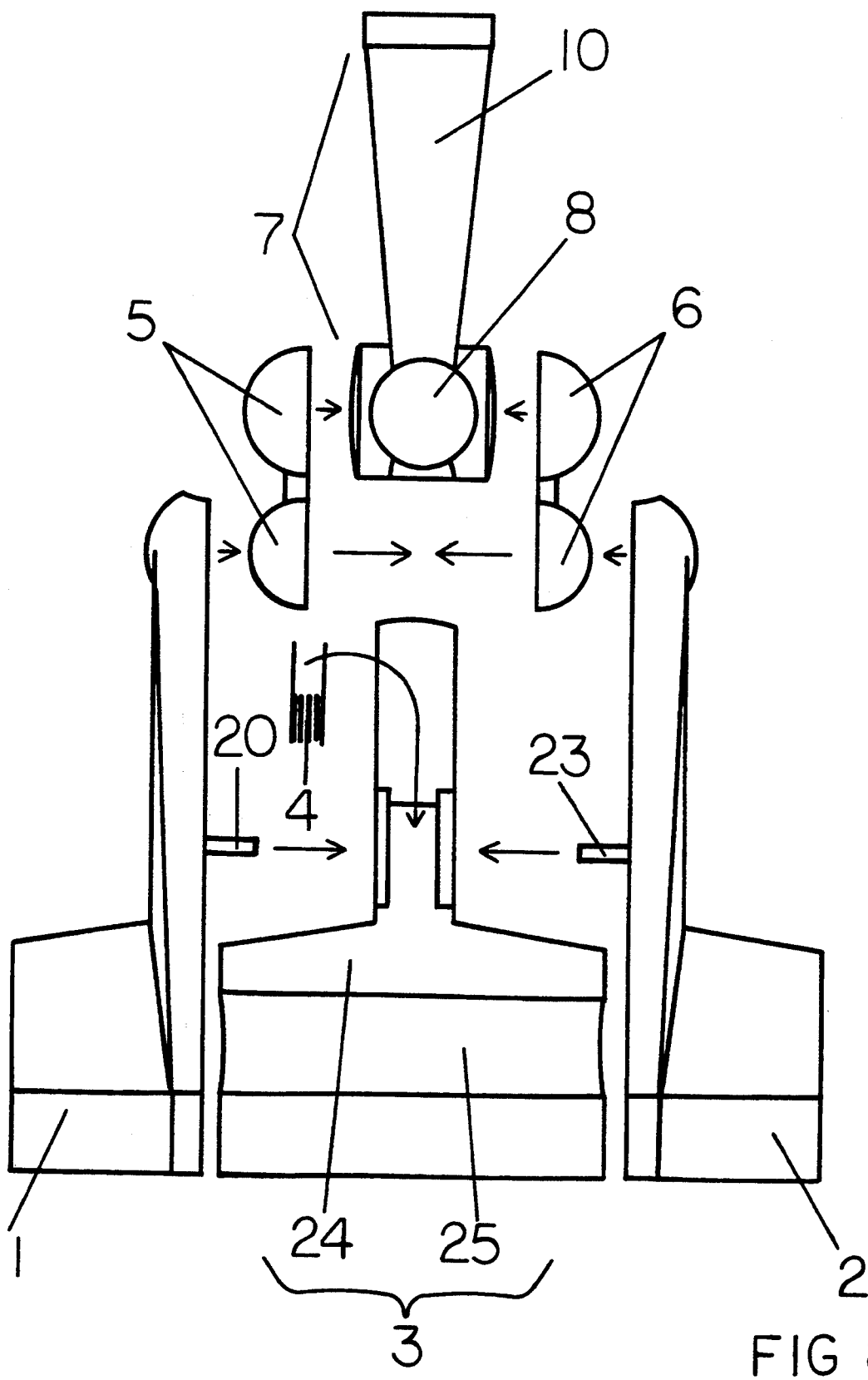
FIG. 8 is a break-apart top perspective of the individual parts necessary to assemble the device in accordance with the present invention. (Arrows indicate proper connection of parts).
Figure 9:
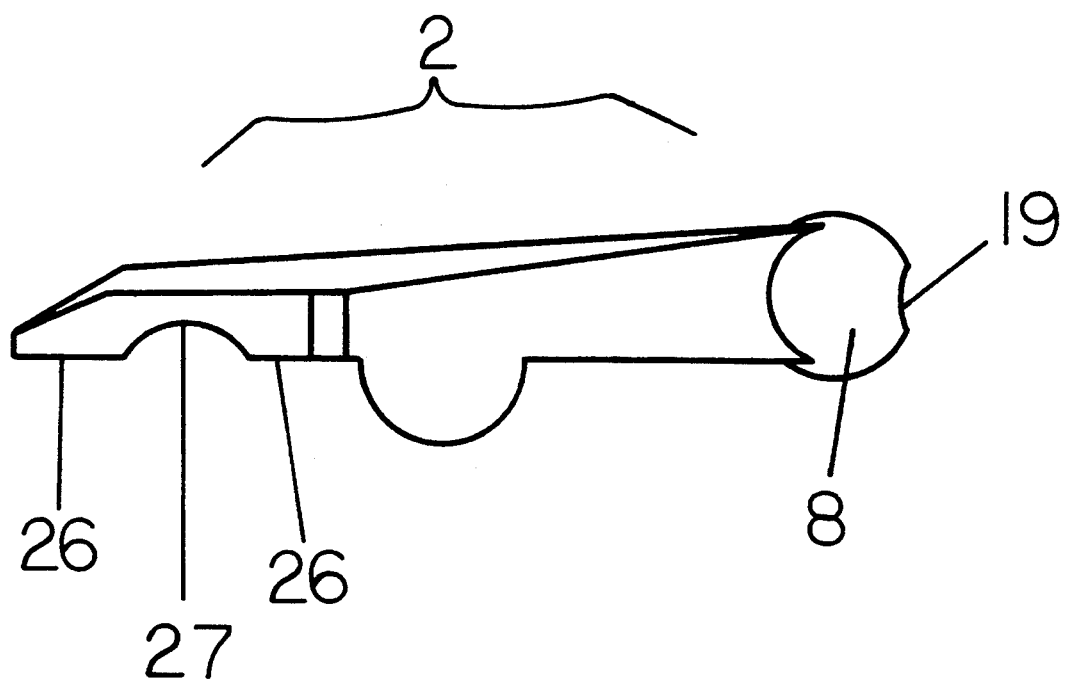
FIG. 9 is a side perspective outside view of the upper-clamp right-frame assembly.
Figure 10:
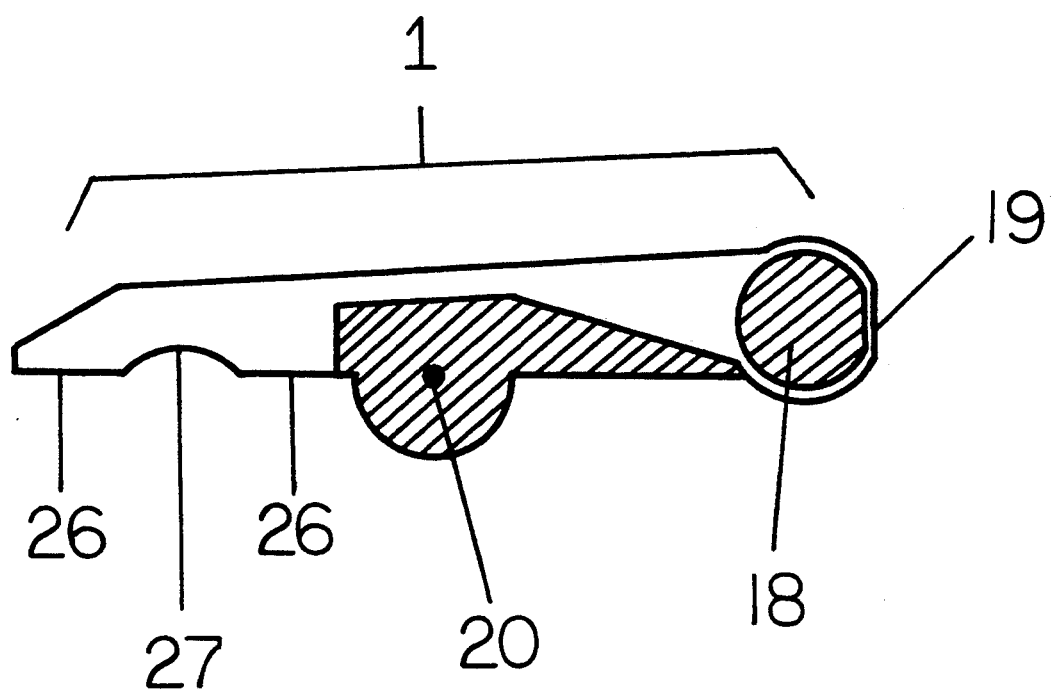
FIG. 10 is a side perspective inside view of the upper-clamp left-frame assembly.
Figure 11:
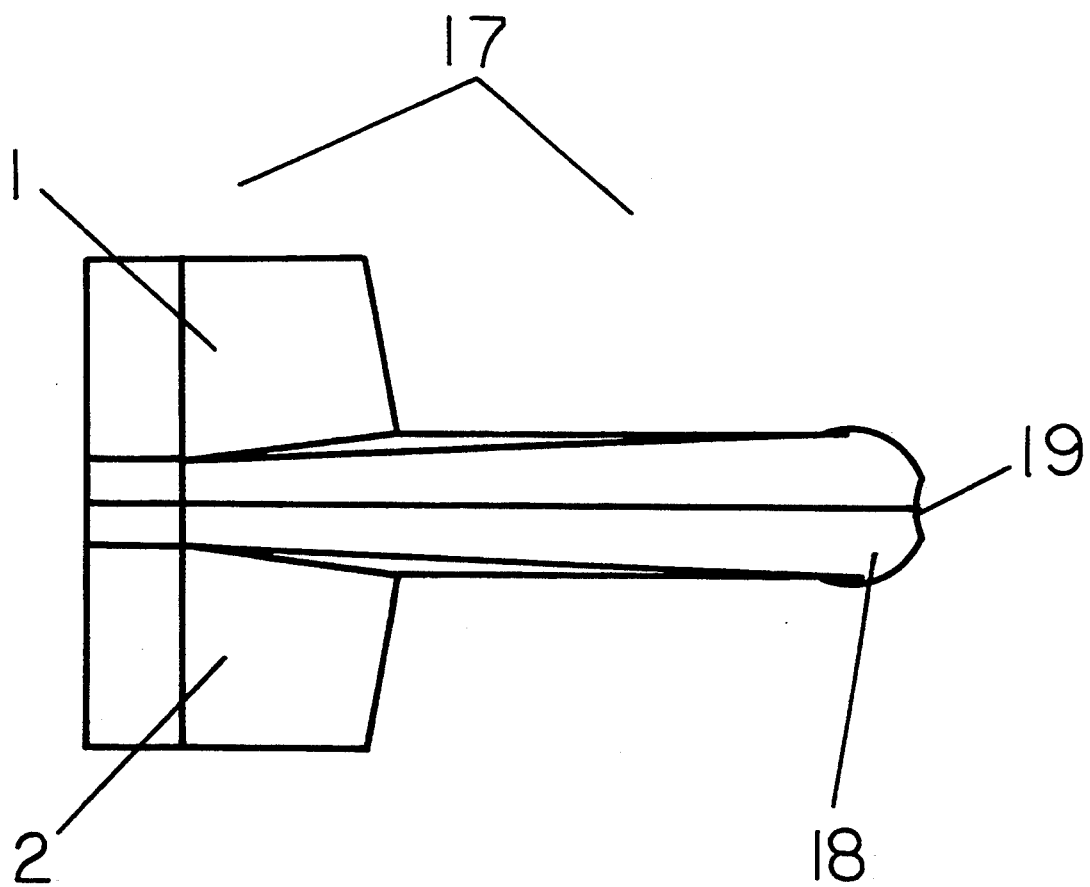
FIG. 11 is a top perspective of the upper-clamp assembly after mating of the left-frame assembly with the right-frame assembly.
Figure 12:
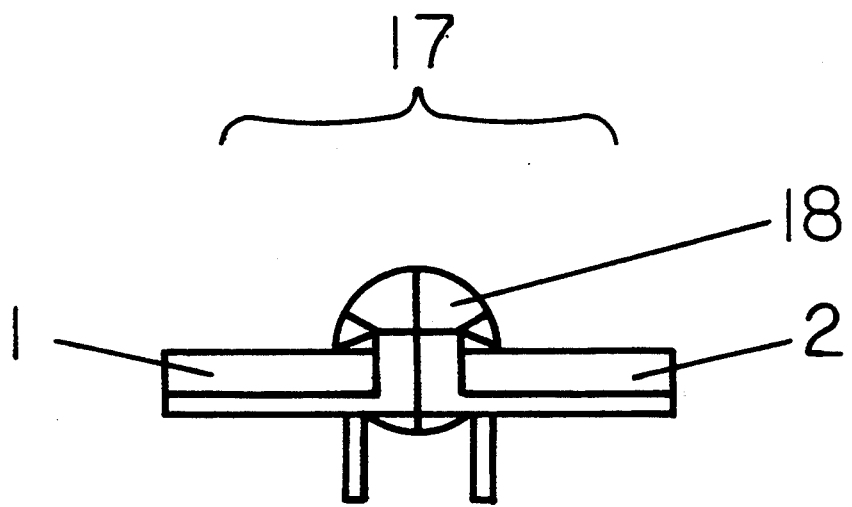
FIG. 12 is a clamp-side perspective of the upper-clamp assembly after mating of the left-frame assembly with the right-frame assembly.
Figure 13:
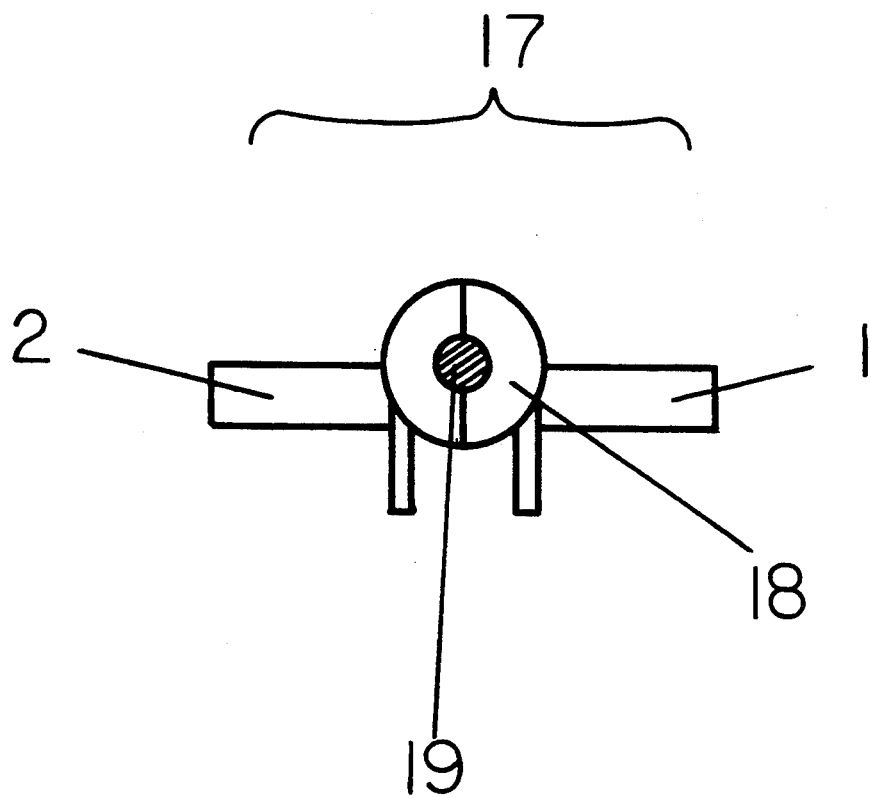
FIG. 13 is a hook-side perspective of the upper-clamp assembly after mating of the left-frame assembly with the right-frame assembly.
Figure 14:
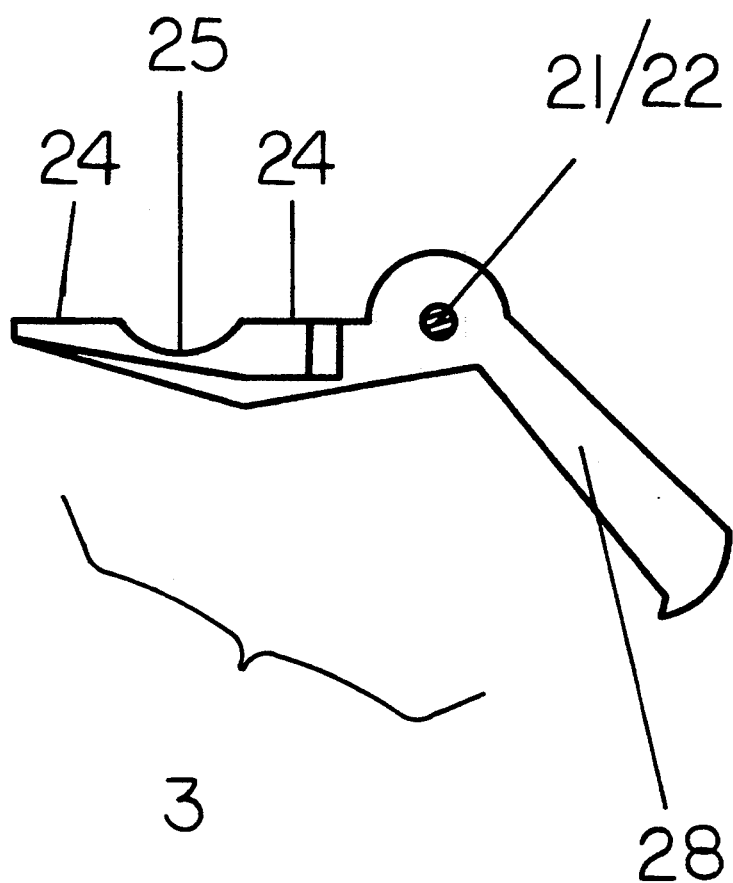
FIG. 14 is a side perspective of the lower-clamp hand-grip assembly.
Figure 15:
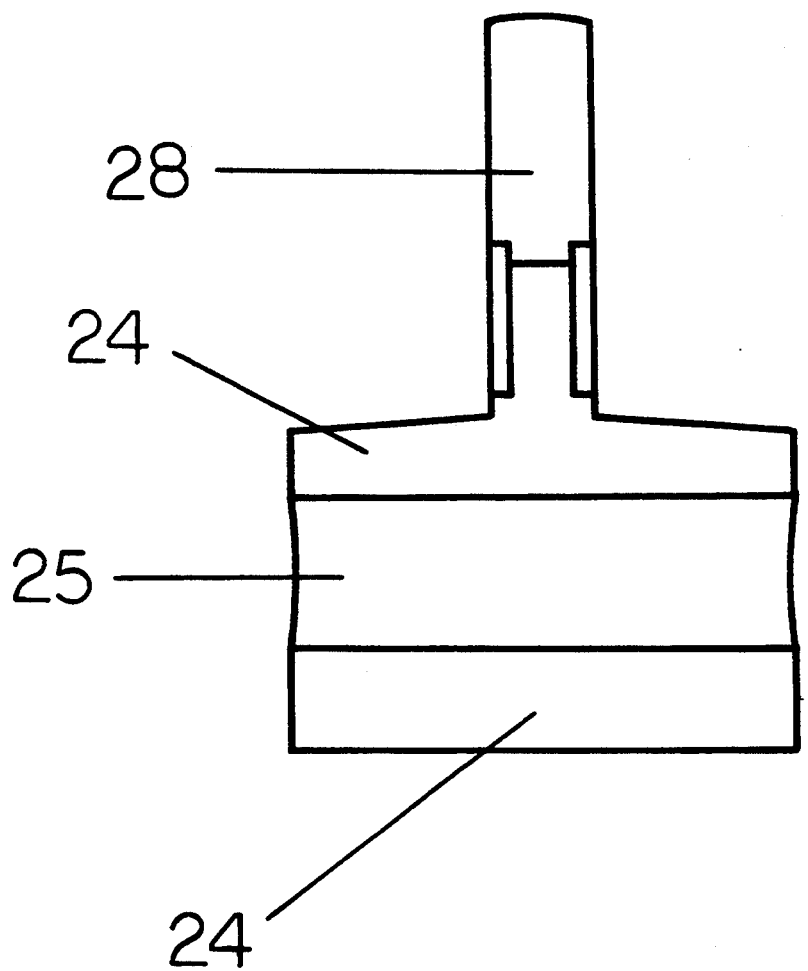
FIG. 15 is a top perspective of the lower-clamp hand-grip assembly.
Figure 16:
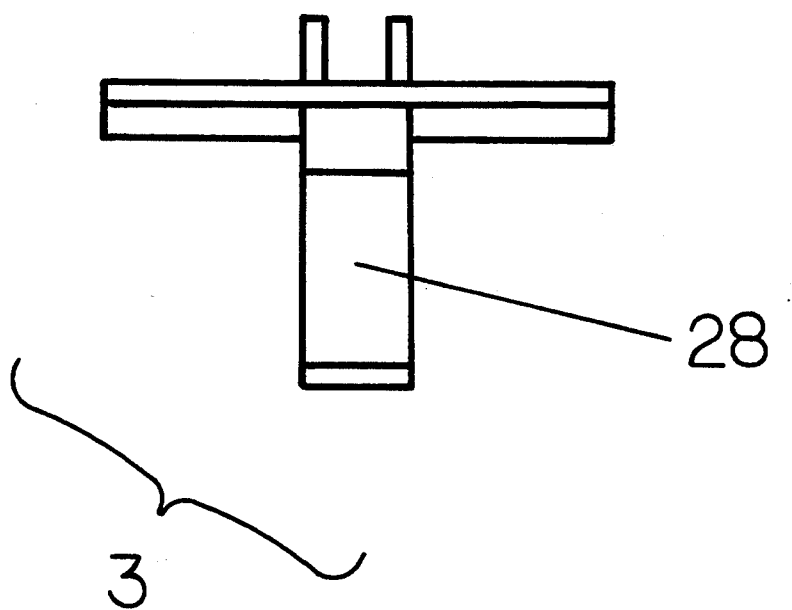
FIG. 16 is a clamp-side perspective of the lower-clamp hand-grip assembly.

Left-frame assembly 1 is formed with a circular hollow protrusion which extends from left-frame assembly 1 and forms upper-clamp and frame assembly outer-frame axle 20 (FIGS. 7, 8, 10). During assembly and prior to the mating of left-frame assembly 1 with right-frame assembly 2, outer-frame axle 20 passes through left mounting hole 21 (FIG. 14), tension spring 4, and right mounting hole 22 (FIG. 14) of lower-clamp hand-grip assembly 3 and mates with upper-clamp and frame assembly inner-frame axle 23 (FIG. 8) which is formed, in a similar manner to upper-clamp and frame assembly outer-frame axle 20 as a solid circular protrusion which extends from right-frame assembly 2 and has a diameter which will allow upper-clamp and frame assembly inner-frame axle 23 to fit inside of upper-clamp and frame assembly outer-frame axle 20.

Upper-clamp and frame assembly outer-frame axle 20 and upper-clamp and frame assembly inner-frame axle 23, once mated, serve as an axle and pivot-point on which lower-clamp hand-grip assembly 3 will pivot freely. Tension spring 4 is then compressed and affixed by a suitable means to the inner-back side of hand-grip assembly 28 (FIGS. 1–3, 5–7, 14–16) and the back-inside of upper-clamp assembly 17 in a manner to cause constant clamping tension at clamp-face sides 24 and 25 (FIGS. 7, 8, 14, 15) of lower-clamp hand-grip assembly 3 and clamp-face sides 26 and 27 (FIGS. 7, 9, 10) of upper-clamp assembly 17. When fully assembled, the result is a constant-grip clamp assembly which allows lower-clamp hand-grip 3, when compressed at hand-grip 28, to pivot on axle protrusion 20 and 23 at mounting holes 21 and 22 and move lower-clamp faces 24 and 25 away from upper-clamp faces 26 and 27 and therefore open the clamp for subsequent and easy removal from and reclamping to any suitable object. When hand-grip 28 is released, tension spring 4 will exert the necessary outward force on hand-grip 28 and a clamping action at upper clamp-faces 24 and 25 and lower clamp-faces 26 and 27 will incur, thus causing the clamp to grip and hold any suitable object inserted between said clamp faces. The resulting clamping action is easily transferable, with one hand, from one suitable support object to another.

Upper clamp-faces 26 and lower clamp-faces 24 are formed in a manner to have a flat surface on each clamp face which creates two flat mating surfaces 29 (FIGS. 1–3, 5, 6) on each inner-side of the clamping face. Upper clamp-face 27 and lower clamp-face 25 are formed in a manner to have a semicircular indent which forms two semicircular non-mating surfaces 30 (FIGS. 1–3) on each inner-side of the clamping face. The use of both flat mating surfaces and semicircular non-mating surfaces on the clamp face of the clamping support assembly allows the clamp assembly to securely grip and hold on to both flat and round objects of suitable size.

The aforementioned portability and the ability to securely grip and hold to both flat and round support objects of suitable size, in addition to the ability to always suspend the receiving hook assembly 7 in a level and receiving position, regardless of the direction in which upper-clamp assembly 17 is positioned, allows the clamp-on utility hook device to be easily employable in a large variety of support and suspension configurations.

LIST AND DESCRIPTION OF INDIVIDUAL AND COMBINED PARTS REFERRED TO IN THE DETAILED DESCRIPTION OF THE DRAWINGS

| Part #: | Description: |
| --- | --- |
| 1 | Upper-clamp left-frame assembly. |
| 2 | Upper-clamp right-frame assembly. |
| 3 | Lower-clamp hand-grip assembly. |
| 4 | Tension spring. |
| 5 | Ball-and-socket left-half adjoining spheres. |
| 6 | Ball-and-socket right-half adjoining spheres. |
| 7 | Hook assembly. Formed from the joining of hook sphere 8, hanging shaft 9, and holding plate 10. |
| 8 | Hook sphere. |
| 9 | Hanging shaft. |
| 10 | Holding plate. |
| 11 | Counter-weight. |
| 12 | Ball-and-socket assembly solid sphere. Formed from the joining of ball-and-socket left-half adjoining sphere 5 with ball-and-socket right-half adjoining sphere 6. |
| 13 | Ball-and-socket assembly hollow sphere. Formed from the joining of ball-and-socket left-half adjoining sphere 5 with ball-and-socket right-half adjoining sphere 6. |
| 14 | Ball-and-socket assembly rotation shaft. Formed from the joining of ball-and-socket left-half adjoining sphere 5 with ball-and-socket right-half adjoining sphere 6. |
| 15 | Sphere 13 circular opening. Allows free movement of hook sphere 8 and hook assembly 7. |
| 16 | Ball-and-socket assembly. Formed from the joining and interworking of clamp assembly 17 hollow sphere 18 with ball-and-socket assembly hollow sphere 13 by way of ball-and-socket assembly solid sphere 12 and rotation shaft 14. |
| 17 | Upper-clamp assembly. Formed from the joining of upper-clamp left-frame assembly 1 with lower-clamp right-frame assembly 2. |
| 18 | Clamp assembly 17 hollow sphere. Formed from the proper molding and joining of upper-clamp left-frame assembly 1 with lower-clamp right frame assembly 2. |
| 19 | Clamp assembly 17 hollow sphere 18 circular opening. Allows free movement of ball-and-socket assembly solid sphere 12, ball-and-socket assembly hollow sphere 13, hook sphere 8, and therefore, hook assembly 7. |
| 20 | Upper-clamp assembly 17 outer-frame axle. |
| 21 | Lower-clamp hand-grip assembly 3 left axle mounting hole. |
| 22 | Lower-clamp hand-grip assembly 3 right axle mounting hole. |
| 23 | Upper-clamp assembly 17 inner-frame axle. |
| 24 | Lower-clamp hand-grip assembly 3 flat clamp-face. |
| 25 | Lower-clamp hand-grip assembly 3 curved clamp-face. |
| 26 | Upper-clamp assembly 17 flat clamp-face. |
| 27 | Upper-clamp assembly 17 curved clamp-face. |
| 28 | Lower-clamp hand-grip assembly 3 hand-grip. |
| 29 | Upper and lower clamp-face mating surfaces. |
| 30 | Upper and lower clamp-face non-mating surfaces. |

I claim:

1. A portable clamp-on hook-type device suitable for holding audio headphones and associated electronic cables, comprising a spring-loaded clamp assembly which can be manipulated with one hand and temporarily attached to any stable device of suitable shape and size; a ball-and-socket assembly attached to said spring-loaded clamp assembly; and a counter-weighted and balanced hook assembly attached to said ball-and-socket ball assembly; said clamp assembly provides for attachment to circular as well as flat support members; wherein said ball-and-socket assembly provides for universal adjustability between the hook assembly and the clamp assembly.

2. A portable clamp-on hook type device suitable for, but not limited to, holding a common set of audio headphones and associated electronic cables comprising a spring-loaded clamp assembly which can be manipulated with one hand: a ball-and-socket assembly attached to said spring-loaded clamp assembly; and a hook assembly attached to said ball-and-socket assembly; wherein said clamp assembly is formed in a manner such that each clamping and gripping surface of said clamp assembly comprises both flat and semicircular surfaces and will allow said clamp assembly to securely grip and temporarily attach to circular as well as flat support members of suitable size.

3. A portable clamp-on hook type device, comprising a spring-loaded clamp assembly; a ball-and-socket assembly attached to said spring-loaded clamp assembly; and a hook assembly attached to said ball-and-socket assembly; said clamp assembly provides for attachment to circular as well as flat support members; said ball-and-socket assembly provides for universal adjustability between the hook assembly and the clamp assembly; wherein said hook assembly is counter-weighted and balanced such that it will remain upright and in a proper receiving position regardless of the direction in which the clamp is positioned when affixed to a suitable support object.

* * * * *